(12) United States Patent
Suess et al.

(10) Patent No.: US 8,560,114 B2
(45) Date of Patent: Oct. 15, 2013

(54) STORAGE AND COMMISSIONING SYSTEM AND METHOD FOR OPERATING THE SAME IN BATCH MODE

(75) Inventors: Heiko Suess, Graz (AT); Klaus Stuebinger, Graz-Puntigam (AT); Rainer Buchmann, Graz (AT)

(73) Assignee: SSI Schaefer Peem GmbH, Graz (AT)

( * ) Notice: Subject to any disclaimer, the term of this patent is extended or adjusted under 35 U.S.C. 154(b) by 0 days.

(21) Appl. No.: 13/279,781

(22) Filed: Oct. 24, 2011

(65) Prior Publication Data

US 2012/0150340 A1 Jun. 14, 2012

Related U.S. Application Data

(63) Continuation of application No. PCT/EP2010/002460, filed on Apr. 22, 2010.

(30) Foreign Application Priority Data

Apr. 24, 2009 (DE) .......................... 10 2009 019 511

(51) Int. Cl.
*G06F 7/00* (2006.01)
(52) U.S. Cl.
USPC ......................................................... 700/216
(58) Field of Classification Search
USPC ................................................. 700/216, 213
See application file for complete search history.

(56) References Cited

U.S. PATENT DOCUMENTS

| | | | |
|---|---|---|---|
| 7,428,957 B2 | 9/2008 | Schaefer | |
| 8,165,929 B2 * | 4/2012 | Chudy et al. | 705/28 |
| 2003/0093171 A1 * | 5/2003 | Soehnlen | 700/117 |
| 2004/0193311 A1 * | 9/2004 | Winkler | 700/216 |
| 2009/0010741 A1 * | 1/2009 | Burgstaller et al. | 414/266 |
| 2010/0036675 A1 | 2/2010 | Schäfer | |
| 2010/0198391 A1 * | 8/2010 | Schafer | 700/216 |

FOREIGN PATENT DOCUMENTS

| | | |
|---|---|---|
| DE | 3413157 | 9/1985 |
| DE | 10340143 | 3/2005 |
| DE | 10 2007 011 856 | 9/2008 |
| DE | 20 2007 009 400 | 12/2008 |
| EP | 0215967 | 9/1985 |

OTHER PUBLICATIONS

International Search Report corresponding to International Application No. PCT/EP2010/002460.

* cited by examiner

*Primary Examiner* — Ramya Burgess
(74) *Attorney, Agent, or Firm* — Renner, Otto, Boisselle & Sklar, LLP

(57) ABSTRACT

A storage and order-picking system and method for processing in parallel a group of picking orders in batch mode, including an order-container conveyor for automatically transporting order containers to specific destinations; an order-picking station; at least one warehouse area which is assigned to the order-picking station and stores articles for processing the group of picking orders in provision locations; a collecting device moveable by an order-picking person through the warehouse area during a collecting process for retrieving in a first processing stage; a reading and displaying device assigned to the order-picking person; an article-reading device for scanning and identifying retrieved articles with a respect to a type of article; a plurality of display devices; and a controlling device which is adapted to: assemble the group of order containers which is to be transported to the order-picking station dependent on the articles stored in the warehouse area.

19 Claims, 6 Drawing Sheets

STORAGE AND COMMISSIONING SYSTEM AND METHOD FOR OPERATING THE SAME IN BATCH MODE

RELATED APPLICATIONS

This is a continuation application of the co-pending International application PCT/EP2010/002460 (WO 2010/127769 A1) filed on 22 Apr. 2010 which claims priority of the German patent application DE 10 2009 019 511 filed on 24 Apr. 2009, which are fully incorporated herewith by reference.

BACKGROUND OF THE INVENTION

The present invention relates to a storage and order-picking system comprising order-picking stations for manually picking articles to order containers, wherein the articles are pre-picked in a "batchwise" manner before being distributed to the order containers, i.e. they are assembled in groups and retrieved from a ware-house in accordance with the group.

RELATED PRIOR ART

The documents DE 34 13 157 and EP 0 215 967 disclose a method and apparatus for assembling consignments of goods in a computer-controlled manner.

A method is described according to which an order-picking warehouse is divided into different zones, wherein at least one of the zones is manually picked in accordance with the "man-to-goods" principle. Order-picking containers (order containers) which are to be filled are transported through the warehouse in a computer-controlled manner. Each zone of the warehouse receives such order containers, which in turn are assigned to picking orders, the articles of which are stored in the zone of the warehouse which is picked manually. For this purpose groups of order containers ("batches") are formed. A controlling computer determines a route-optimized collecting order according to which articles are retrieved from the warehouse zone in dependence on a type of article and number thereof, and subsequently distributed to the grouped order containers. In order to process the retrieval order, an order-picking person walks through the warehouse with a collecting trolley in a route-optimized manner. The collecting trolley holds a tray which is divided, for example, into 10 compartments corresponding to the number of the group of order containers to be processed. Thus, each of the order containers is assigned to one compartment of the tray. A collecting order is determined for each compartment. Each of the collecting orders is printed and put to the respective compartment for the purpose of processing (collecting articles from the warehouse). If all of the collecting orders are processed, the picker returns with the collecting trolley, on which the tray is located, to a so-called transfer station where the tray is separated from the trolley. Then, the tray is automatically moved over a conveyor on which the waiting order containers are automatically passing the tray underneath, wherein the bottom of the tray is formed such that each of the compartments can be opened downwardly in an automated manner for releasing in this way the articles collected in the compartment to the order container being passing underneath.

One drawback of this known system and method is the high order-picking error ratio. At no time it is checked whether the articles retrieved from the warehouse are the right articles. This needs to be done later in a check zone. It is not checked whether the retrieved articles have been put into the right compartment. It is not checked whether the right number of articles has been removed from the warehouse. It is not checked whether the right tray compartment was delivered to the right order container. It is not ensured that the bottoms of the compartments are always opened in the right manner. It is not verified whether the articles falling down from the compartments do actually land in the assigned order container. All this makes it necessary with these known methods and systems to establish an additional check zone for manually checking whether actually all of the articles of the picking order are present in the associated order container. This increases both the amount of work involved and investment costs since a check station needs to be established beside the order-picking station.

Another drawback in this context is to be seen in the relatively high costs for providing the completely automated transfer station. The transfer station is susceptible to maintenance and errors due to the plurality of mechanical components of the transfer station such as a lifting mechanism, an opening mechanism and similar.

Additionally, always more than one collecting trolley is required for allowing the known system to be operated continuously. While one of the collecting trolleys is in the transfer station for separating the tray from the trolley, the order-picking person either stands awaiting in front of the transfer station or at least a second order-picking trolley including a tray needs to be provided so that the order-picking person can process the next collecting order while the first collecting trolley is processed in the transfer station.

Another drawback is to be seen in an unfavorable limitation of the dimensions of the to-be-picked articles due to the subdivision of the compartments of the trays. Starting from a conventional dimension of an order container (e.g. 60×40×30 $cm^3$) the dimension of the tray is facing a natural limit. On the one hand, this limit is defined by the handling capability of the tray or the collecting trolley during a picking process through the warehouse. Under the assumption that the tray has a length of about 1 m and a width of less than 60 cm, the tray can thus have a width of 10 cm at maximum, if 10 compartments are to be provided side-by-side, as proposed in the above-mentioned documents. However, articles as they are usually handled, for example, in the mail-order business have a lateral length which is typically greater than 10 cm. Thus, only relatively few articles (e.g. 2-3) can be collected in each of the compartments so that it is questionable whether, for example, a mail-order business warehouse can be operated efficiently in accordance with the known methods at all.

An additional disadvantage with the handling of the articles is to be seen in the automated release of the articles into the order containers. The articles are falling chaotically into the order containers since the compartment bottoms are simply opened . In the mail-order business, the articles are typically picked directly into the order carriers (e.g. cardboard packages). A release of the articles, which is "chaotical" in this sense, to the order container usually is not desired. Due to a lack of space it is necessary to properly sort and stack the articles in the order containers, thereby allowing to put as much as possible articles into one and the same order container or to need as less space as possible for a predetermined number of articles.

Another method for batch-order picking is also known. In this context the order-picking person drives through rack aisles of a warehouse, for example, on a storage and retrieval device or rack servicing unit, wherein a plurality of order containers are carried on the vehicle. With this "man-to-goods" order-picking principle individual provision locations of the warehouse are approached, wherein in this case all of the articles being stored at this provision location and being required by the order are removed. However, after the processing of the corresponding picking order the order containers are typically so heavy that employment of machines for transporting the plurality of order containers is required. Free movement (independent from machines) of the order-picking person through the warehouse is no longer possible. The required storage and retrieval devices and rack servicing units are expensive and restrict the flexibility, in particular if one moves in a high-bay warehouse.

SUMMARY OF THE INVENTION

Based on this situation it is an object of the present invention to provide an improved storage and order-picking system as well as a corresponding order-picking method suitable for batch operation, which overcomes the above-mentioned disadvantages.

According to one aspect of the present invention there is disclosed in a storage and order-picking system comprising at least one warehouse area and one order-picking station assigned to the at least one warehouse area, the at least one warehouse area comprising a plurality of provision locations where respectively articles of one type of article only is stored, the order-picking station comprising a plurality of buffer locations, wherein each of the buffer locations respectively comprises a display device, wherein stored articles are manually removed and delivered by an order-picking person who is equipped with a collecting device for buffering removed articles, a method for operating the storage and order-picking system in a two-stage batch mode includes: detecting a plurality of picking orders, wherein each of the picking orders comprises a plurality of ordered articles which differ in type of article and quantity ordered, and is assigned to at least one of the order containers; analyzing the detected picking orders in order to determine a group of order containers, the assigned picking orders of which do all require articles stored in the at least one warehouse area; determining the group of order containers; moving the determined group of order containers to the order-picking station, wherein each of the order containers of the determined group of order containers is buffered at one of the buffer locations; determining a collecting order based on the picking orders assigned to the order containers of the group of order containers; retrieving to-be-picked articles from the at least one the warehouse area in accordance with the collecting order, wherein the step of retrieving comprises: the order-picking person moves in a route-optimized manner through the at least one warehouse area, manually removes articles in accordance with the collecting order and delivers the same unsorted to a collecting device, which is carried by the order-picking person for buffering the removed articles; and manually distributing the retrieved articles to the group of order containers provided at the buffer locations, wherein at least one article of each type of article retrieved is scanned and identified before the order-picking person gets signalled by one of the display devices to which of the associated order containers a respective quantity of articles of the scanned and identified type of article is to be transferred from the collecting device.

The method of the present invention allows to divide an order-picking process substantially into two stages. In the first stage all of the articles, which are required for the processing of a group of order containers, are retrieved from the warehouse. In a second stage the articles collected in this manner are distributed to the individual order containers. While doing so, the order-picking person needs to perform substantially three actions, namely removing and collecting, in an unsorted manner, articles from the warehouse; transferring the collected articles into the order containers and assigning (sorting) the collected articles to the predetermined order containers. All of these actions are performed under the highest possible degree of control and examination. The order-picking person needs to be concentrated less in comparison to the known methods for performing properly all of the actions. During the collection of the articles from the warehouse one only needs to pay attention, if necessary, that the right number is removed. The delivery of the removed articles to a collecting container happens chaotically. The delivery does not need to happen to a predetermined compartment since the collecting container is not subdivided. Thereby, a substantial amount of time is gained. However, the order-picking person only receives one single collecting order so that less errors occur due to the reduced number of collecting orders. Additionally, a route optimization is actually put into action since the order-picking person does not need to process a number of collecting orders in parallel, as it was usually done in the prior art.

Before the collected articles are distributed to the order containers, they are detected and identified in the order-picking station. A superordinated controlling computer activates, for example, lamps in dependence on the identified type of article, the lamps being provided in an immediate proximity of the order containers at the buffer locations and indicates the order containers which require the identified type of article. Thereby, the order-picking person is visually guided towards the right order container or the right order containers. A misassignment is almost excluded since the order-picking person does still hold the article in its hand which was scanned briefly before. The order-picking person "sorts" the to-be picked articles only once, namely during the assignment to the right order container or order containers during the distribution at the order-picking station. According to the prior art, the order-picking person needed to perform a first sorting process already at the time of collecting the article, namely at the time when an article, which was retrieved from the warehouse, needed to be delivered to a compartment of the tray on the collecting trolley. Another sorting process was required when the articles collected in the compartments were delivered to the waiting order containers since in this moment it needed to be ensured that a specific compartment was actually released to the predetermined order container.

Dependent on the embodiment, the display devices at the buffer locations comprise, according to the present invention, besides the optical signal transmitter such as lamps, also digital displays which can signal to the order-picking person how many articles of a type of article which has just been detected and identified is to be delivered to a corresponding order container. This facilitates the order-picking person's work a lot since the order-picking person only needs to scan each of the collected types of articles only once, and then distributes this detected and identified type of article to the order containers until all of the collected articles of this specific type of article are distributed to the order containers.

Due to the fact that order-picking errors are almost excluded in accordance with the method of the present invention, it is no longer necessary to provide a checking station subsequent to the order-picking station. Checking an order, as soon as it is completely picked, is no longer required. Thereby, investment costs as well as working time can be saved. Thus, the method of the present invention is more efficient than the known method. The performance is higher since more picking orders per unit of time can be completed on average.

Further, the overall investment costs are lower since automation of the second step is not needed. Compared to the known method less collecting devices are required. If only one single order-picking person is working in a warehouse area, only one collecting device needs to be provided. Provision of a number of collecting devices is not required for ensuring a continuous operation of the order-picking station.

The order-picking person can already leave the order-picking station for taking care of a new collecting order which is generated (in advance) in accordance with new order containers, which are just delivered, while a completely picked group of order containers is transported away for being replaced by the new group of order containers. In this manner, again time can be saved.

In accordance with a preferred embodiment each of the removed articles of the collecting order is detected and identified before being distributed while the order-picking person individually scans each of the removed articles at the order-picking station, wherein the display devices of the buffer locations in this case merely need to indicate to which of the order containers this specific article, which has been identified, needs to be transferred.

If each of the articles of the collecting order is detected and identified briefly before being distributed to the order containers, it is no longer necessary to indicate how many articles of this type need to be distributed to a respective one of the order containers. This way of procedure certainly increases the efforts slightly since all of the articles of a collected collecting order are individually detected. But the quality of the picking process is also increased thereby since an error is not possible with regard to the numbers of articles which are to be delivered to each of the order containers. The order-picking person is merely signalled one single order container, and therefore does not need to concentrate on other order containers which do also require this type of article and are arranged beside the order container which is currently processed. Acknowledgement of a delivery of a collected article to one of the order containers happens automatically by reading the next article since the preceding article has been delivered.

Further, it is preferred if each of the warehouse areas is served by more than one order-picking person at the same time, wherein preferably each of the order-picking persons is assigned to an individual indentification signal (color, frequence, tone, sign, etc) for allowing identification of an order container at the order-picking station by means of the display devices thereof.

There are many ways how, for example, two order-picking persons can work in parallel in each warehouse area and at each order-picking station. In accordance with a first variation, the first stage is performed by a first order-picking person and the second stage is performed by a second order-picking person. In accordance with a second variation, a collecting order is divided into two partial collecting orders which can then be processed sequentially or in parallel, wherein each of the order-picking persons performs both stages. In accordance with a third variation, a number of collecting orders, which can also be partial collecting orders, are processed in parallel. In order to avoid that the order-picking persons disturb each other or are misguided during simultaneously putting or ordered sorting into the order containers, for example, a two-color display unit can be provided such as a lamp which can be lit up red and simultaneously green. If it happens that during the distribution of the collected articles to the order containers, both of the order-picking persons need to deliver their articles, which they have just scanned and identified, to one and the same order container, then the display device of this order container is recognizably lit up with both colors. If necessary, two digital displays are then to be provided in dependence on the variation of the above-described delivery process.

In accordance with another advantageous embodiment, before the removal, the provision locations are signalled to the order-picking person by means of a reading and display device which can be carried by the order-picking person.

For example, the order-picking person carries a so-called "hand-held terminal" or a finger scanner with an associated display device, wherein the display device can be mounted, for example, to the forearm of the order-picking person. Printing of a collecting order is not required. The collecting order generated by the superordinated controlling device is preferably transmitted electronically to the order-picking person in accordance with a route-optimized sequence. Then, the order-picking person walks through the assigned warehouse area and collects from the warehouse the articles required for the processing of the group of picking orders (batch).

Further, it is preferred to detect the provision locations before articles are retrieved, and transmit the same to a controlling device for the sake of examination.

In this manner an additional safety measure is installed. Before the order-picking person puts an article from a provision location of the warehouse, which was previously indicated to him, into the collecting trolley, he, for example, scans an identification, which is specific for a corresponding provision location and which is fixed to the provision location, for example, in terms of a bar code. In this manner the superordinated controlling device can verify that the order-picking person takes articles from the right provision location. The order-picking person can also be signalled that apparently articles from the wrong provision location were retrieved, if necessary.

With another embodiment the processing of a group of picking orders is started by detecting an identification of the order-picking station by the order-picking person.

In order to signal to a superordinated controlling device that an order-picking person in his warehouse area is ready to process a new group of picking orders, the order-picking person can, for example, scan by means of its reading and display device a bar code which is specific to one of the order-picking stations and warehouse areas (i.e. specific to a warehouse zone). In this manner, the controlling computer is signalled that the order-picking person is ready to receive a new collecting order. If necessary, the controlling computer can start the transport of a new group of order containers towards the corresponding order-picking station, if the warehouse zone is not already provided with a group of order containers waiting. Otherwise, the order-picking person can also be assigned another warehouse area for the sake of either supporting or processing another group of picking orders.

Further, it is advantageous if a partial collecting order, which concerns a bulky article, is processed in terms of an individual order separately from the actual collecting order, which corresponds to the remaining collecting order.

Collecting orders time after time comprise order lines which are related to a type of article which is uncommon in an arbitrary manner. Typically, types of the category "C" are concerned in this case as it will be explained in more detail below. In particular, bulky articles are to be mentioned exemplarily here, having dimensions which deviate significantly from the conventional remaining articles. If such articles were integrated normally into the collecting orders, it could happen that the collecting devices do not have sufficient capacity for receiving all articles of the collecting order. For excluding this risk from the beginning, it can be advisable to pick such bulky articles separately. For this purpose, corresponding remarks can be deposited in a database additional to the bulky article types so that the controlling computer recognizes at the time of generating the collecting orders that this bulky article type is to be handled separately. Instead of generating one single collecting order, then a partial collecting order is generated including all "normal" articles, and one separate partial collecting order (individual order) is generated including the bulky article type. The sum of these orders then corresponds in turn to the overall collecting order.

In this manner it is avoided that unpredictable interruptions during the processing of picking orders occur.

Additionally, it is advantageous if a container identification, which is assigned to the buffer location on which the respective order container is buffered at the order-picking station, is detected for each of the order containers.

In this manner it can be ensured that the order container is actually located at one of the buffer locations being expected by the controlling computer. Typically, the container identifications are only detected at the entrance of an order-picking zone (warehouse area including the order-picking station). But it is now possible that the sequence of the order containers is changed on the (conveyance) route between the entrance of the zone and the order-picking station, wherein in worst case one of the containers is completely removed so that the expected sequence does not match any longer with the actual sequence. Therefore, the sequence of the order containers can be (again) examined and verified at the entrance of the order-picking station. This prevents erroneous picking processes additionally.

According to another aspect of the invention it is disclosed a storage and order-picking system for processing in parallel a group of picking orders in batch mode is disclosed, the group of picking orders comprising a plurality of picking orders including a plurality of ordered articles which differ in a respective type of article and quantity, and being assigned to a group of order containers comprising a plurality of order containers, wherein the ordered articles are removed and delivered manually by at least one order-picking person, the system comprising: at least one order-container conveyor configured to automatically transport order containers to specific destinations in the system; an order-picking station, wherein the order-picking station comprises a plurality of buffer locations each being adapted for respectively receiving and buffering one of the order containers of the group of order containers, wherein each of the order containers of the group of order containers has assigned one of the picking orders of the group of picking orders; at least one warehouse area which is assigned to the order-picking station and stores articles required for processing the group of picking orders in provision locations; a collecting device moveable by the order-picking person through the at least one warehouse area during a collecting process for retrieving in a first processing stage, in accordance with a collecting order, all of the stored articles required for processing the group of picking orders from the at least warehouse area by removing the stored and required articles and buffering the same in the collecting device; a reading and displaying device assigned to the order-picking person, which is configured to display to the order-picking person information on the articles to be retrieved based on the collecting order; an article-reading device for scanning and identifying retrieved articles (68) with a respect to a type of article; a plurality of display devices, wherein each of the buffer locations has assigned one of the display devices; and a controlling device which is adapted to: assemble the group of order containers which is to be transported to the order-picking station dependent on the articles stored in the at least one warehouse area, and move the same to the order-picking station; generate a route-optimized collecting order based on the articles required by the group of order containers; display the route-optimized collecting order to the order-picking person; operate the display devices of the buffer locations such that the order-picking person, after completing the retrieving process in accordance with the first processing stage, is signalled in a second processing stage, based on articles retrieved in the first processing stage and identified by means of the article-reading device, to which of the order containers provided at the buffer locations the identified article is to be distributed; and discharge the group of order container from the order-picking station, if all of the retrieved articles are distributed to the group of order containers.

The above-mentioned elements are required for putting into practice the above-explained order-picking method according to the present invention.

In accordance with a preferred embodiment the warehouse area is facing the order-picking station and preferably comprises racks.

Shelving racks can be filled easily. In this manner, the articles can be removed easily as well.

In accordance with a preferred embodiment the substantially B- and/or C-articles are stored.

B-articles and C-articles are articles according to the ABC-distribution (Pareto distribution) statistically occuring less often in picking orders. In this case it makes sense to manually process the picking orders.

The warehouse area preferably comprises additional flow rack channels which are directly adjacent to the order-picking station, wherein substantially A-articles are stored in the flow rack channels.

A-articles are articles which occur less often from a statistical point of view. For keeping the routes of the order-picking person in this case as short as possible, these articles are directly provided at the order-picking station. These A-articles preferably are not integrated into the collecting orders either, but are picked separately.

In accordance with another advantageous embodiment the buffer locations are implemented by means of a conveyor, in particular by accumulation conveyor segments.

Due to the use of conveyors at the buffer locations the order containers, which stand on the buffer locations, do not need to be moved manually within the order-picking station. This allows a high degree of automation of the container conveyance and an increase of ergonomics since heavy order containers do not need to be moved by the order-picking person. If it is necessary accumulation conveyors can be utilized as well, in order to be able to move each of the order containers separately by default.

Even further, it has proven advantageous if the conveyor of the order-picking station is coupled to the order-container conveyor via feeding and discharging devices, and preferably is arranged substantially parallel relative to the order-container conveyor.

The order-container conveyor ensure the supply of order containers to the order picking stations which can be arranged also in parallel and/or in a sequence one after the other (respectively having correspondingly assigned a warehouse area). Arbitrary order containers from an order-container stream on the order-container conveyor can be discharged towards an order-picking station or to an order-picking zone via the feeding and discharging devices, in order to change the sequence of the order containers (on the order-container conveyor) arbitrarily. The controlling computer decides to discharge dependent on whether an article, which is required for the purpose or processing the picking order being assigned to the order container, is present in the order-picking zone, i.e.

the warehouse area. In this manner groups of order containers—and thus also corresponding groups of picking orders—can be formed. Then, the collecting orders are generated from these groups of order containers or groups of corresponding picking orders. The order-picking stations can be connected to the order-container conveyor in terms of U-shaped "railroad stations", in order to avoid unnecessary disturbances of the container flow on this main route.

The reading and displaying device preferably is a hand-held terminal having an integrated scanner, or is a finger scanner having a separate display, wherein the finger scanner can be shaped like a ring and wherein the display can be attached at the body of the order-picking person, preferably at one of the order-picking persons arms.

The above-mentioned explanations in the context of the reading and displaying device are referred to.

Even further, it is advantageous if the display devices of the buffer locations respectively comprise at least one optical signalling device for indicating at least the buffer location, and preferably also a number of articles of the collecting order which are to be transferred and which differ from the number one, towards the order-picking person.

In accordance with another preferred embodiment each of the provision locations is provided respectively with one additional displaying element, wherein the additional displaying elements signal to the order-picking person the location and/or a number of articles to be removed.

The advantages and merits thereof have already been explained above.

Additionally, it is advantageous if the article-reading device is a scanner which is either mounted to the order-picking station or the collecting device.

If the article-reading device is mounted to the order-picking station this allows the detection and identification of the collected article at the transfer location if the collected articles are distributed to the order containers. In this manner it is ensured that as little time as possible between the time of identification of the collected articles and the actual delivery into one of the order containers is sufficient so that the error rate is almost zero.

The same is possible if the article-reading device is mounted to the collecting device. Then, in addition to the above-mentioned advantages it is possible to verify even during the removal of the articles from the racks or from the warehouse area, whether the removed article actually matches the article expected according to the collecting order. Also this measure increases the order-picking quality in addition.

It is clear that the above-mentioned and hereinafter still to be explained features are not only applicable in the respectively given combination but also in other combinations or alone, without departing from the scope of the present invention.

BRIEF DESCRIPTION OF THE DRAWINGS

Embodiments of the invention are shown in the drawings and will be explained here in more detail in the following description, wherein.

PREFERRED EMBODIMENTS OF THE INVENTION

Figure 1:
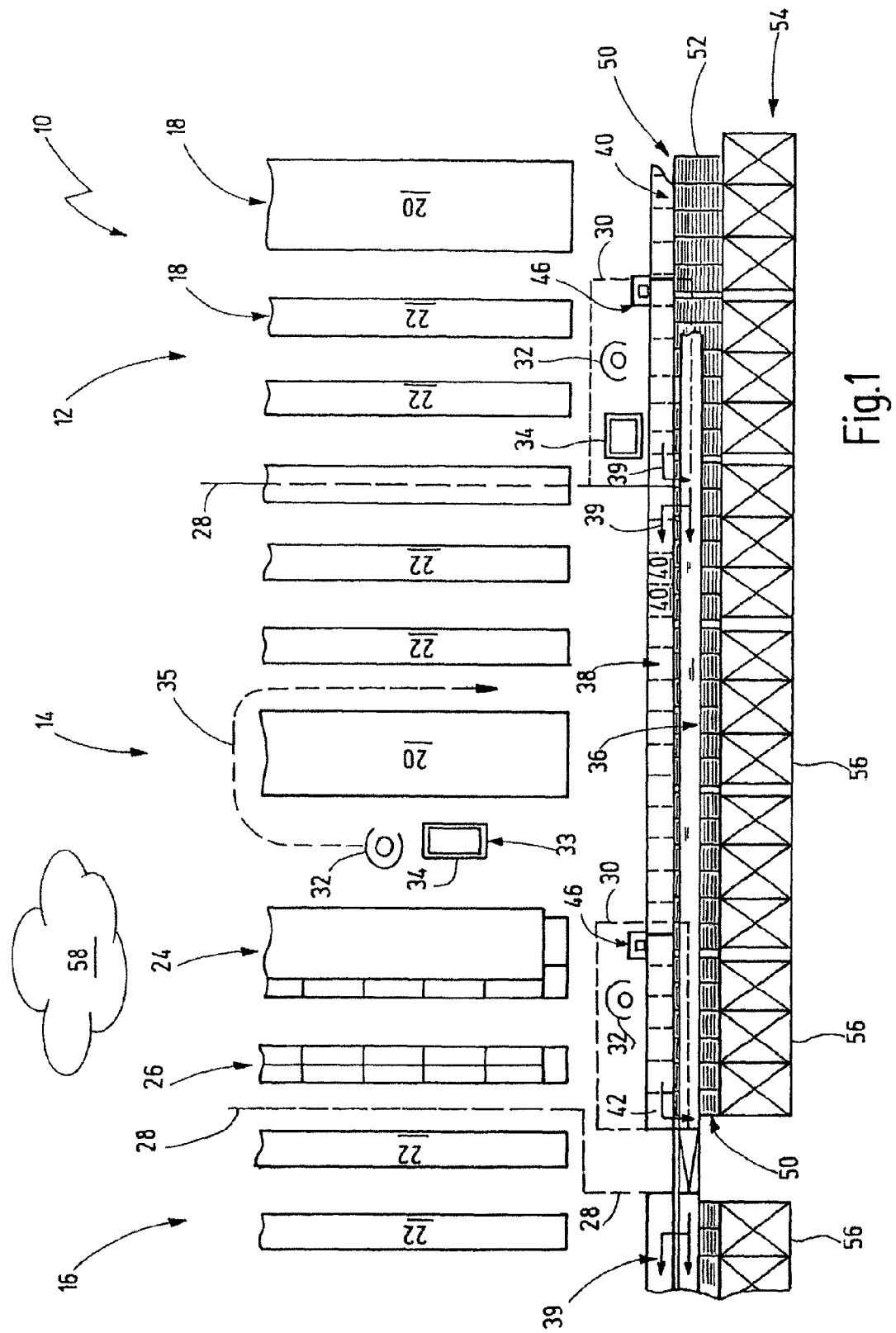
FIG. 1 shows a top view of a warehouse and order-picking system in accordance with the present invention.

A storage and order-picking system in accordance with the present invention is generally designated with the reference numeral 10 in the following figures. Identical features will be provided with the same reference numerals in the figures. It will be pointed explicitly to differences which are based on differing embodiments.

The present invention operates according to the "man-to-goods" principle. In the present case the order-picking process is performed in two stages, which is also called batch picking. With a batch picking process a group of customer orders (picking orders), which is called a "batch", is assembled by retrieving the articles from a warehouse in a first stage in accordance with a required overall quantity, and in a second stage the articles are distributed to orders, i.e. order containers (sorted by orders). The sorting—and thus the second order-picking stage—is performed manually.

A picking order consists of one or more order positions. An order position is also called an order line. An order position provides a respective quantity of a required (i.e. ordered) type of article. An "order batch" is to be understood as an assembly of a number of picking orders being grouped to one processing lot. Contrary to an interactive processing, in batch operation assembled orders are input without interruption by means of user inputs. Therefore, all data required for carrying out the picking orders should be present already before the start of the order-picking process. In the "batch operation", which equals batch processing in terms of technical data, all processes are at first collected and sorted by a data-processing system using a specific program, in order to be processed sequentially.

An order container is a order-picking container into which article units are deposited in accordance with picking orders. If order containers are mentioned hereinafter, this comprises in general containers, trays, cardboard boxes, scales, bags and similar.

With reference to FIG. 1 a top view of a storage and order-picking system 10 of the present invention is shown.

The storage and order-picking system 10 of FIG. 1 comprises, for example, three order-picking zones. Each of the order-picking zones respectively comprises warehouse areas 12, 14 or 16 each of which has assigned at least one order-picking station 30. Each of the warehouse areas 12, 14, or 16 can comprise rack blocks 18 of different sizes. For example, a huge rack 20 and a smaller rack 22 are shown in FIG. 1. A detailed illustration of rack blocks 18 is shown in terms of a combined rack 24 and a double rack 26 in the warehouse area 14. The order-picking zones are separated from each other in FIG. 1 by means of imaginary lines 28. Each of the order-picking zones is operated in an autarkical manner.

Each of the order-picking zones comprises at least one order-picking station 30 which will be explained in more detail with reference to FIG. 2. In each of the order-picking zones at least one order-picking person 32 is working. One order-picking person 32 is working in the order-picking zone being depicted on the right-hand side of FIG. 1. Two order-picking persons 32 are working in the central order-picking zone.

The order-picking person 32 has a collecting device 33 for retrieving articles from the warehouse areas 12-16 in a first stage. The collecting device 33 can be, for example, a collecting container on rollers, a portable collecting basket, a trolley or similar. A receiving volume of the collecting device 33 is preferably selected such that all articles of one batch can be collected in one turn in the first stage, in order to be distributed to a group of order containers in a second stage. In FIG. 1, the order-picking person 32 in the center order-picking zone carries an order-picking trolley 34 for collecting articles from the warehouse area 14, which can be delived subsequently by another order-picking person 32 to order containers 44 (cf. FIG. 2) at the order-picking station 30. The order containers 44 are transported towards the order-picking station or the order-picking stations 30 by means of an order-container conveyor 36. The order-container conveyor 36 serves for feeding and transporting away the order containers 44. The order-container conveyor 36 connects the order-picking zones between each other in terms of a material flow. In this manner it is possible that picking orders are processed in terms of partial orders within different order-picking zones, wherein each of these partial orders is handled as an independent picking order within the respective the picking-order zone.

With the aid of feeding and discharging devices such as pushers, liftable belt conveyors, etc., which are indicated in FIG. 1 by means of arrows 39, the order containers 44 can be exchanged between the order-container conveyor 36 and another conveyor 38. The other conveyor 38 preferably runs in parallel relative to the order-container conveyor 36. The other conveyor 38 runs through the order-picking stations 30. In this manner, a container stream can be decoupled from the main conveyor 36 during an order-picking process. The conveyor 36 and the other conveyor 38 can be realized in terms of different conveyor types such as chain conveyors, belt conveyors, roller conveyors or similar. Preferably, accumulation conveyor segments 40 are used such as accumulation roller conveyors.

Within the area of the order-picking station 30, being indicated in FIG. 1 by means of a dashed line, the other conveyor 38 comprises a number of buffer locations 42 (in particular six to eight) which are preferably realized in terms of the accumulation conveyor segments 40. Each of the buffer locations 42 serves for receiving one of the order containers 44 at the order-picking station 30.

In FIG. 1 a container identification device (e.g. a scanner), which is not depicted in more detail, can be provided at an entrance of the order-picking station, in order to detect and identify each of the order containers 44 entering the order-picking station 30. For this purpose, the order containers 44 are provided, preferably, with a container identification such as an individualizing bar code. Additional container identification devices are preferably provided at the entrance of each of the order-picking zones or in an area of the feeding and discharging devices 39.

In addition, each of the order-picking stations 30 preferably comprises a stationary article-reading device 46. The article-reading device 46 can be implemented; for example, by a bar code scanner 48 (cf. FIG. 2). The article-reading device 46 can be arranged stationary within the area of the buffer locations 42. Alternatively, the article-reading device can also be carried by the order-picking person 32 as will be explained in more detail below.

Further, flow rack channels 50 can be arranged in the area of the other conveyor 38, and in particular in the area of the buffer locations 42, within the order-picking station 30. The flow rack channels 50, which are exemplarily implemented in terms of roller tracks (gravity tracks) in FIG. 1, serve for presenting preferably A-articles which are required relatively often for processing picking orders. B-articles and C-articles are preferably stored in the rack blocks 18.

In FIG. 1 a pallet warehouse 54 is exemplarily provided adjacent to the flow rack channels 50, the pallet warehouse holding loaded pallets 56. The pallets 56 serve as a supply storage for the flow rack channels 50 and/or the warehouse areas 12-16. Opposite to the order-picking stations 30 the flow rack channels 50 can be fed with supplies by means of the pallets 56 which are moved by storage and retrieval devices and/or rack servicing units. The supply is performed spatially decoupled from the order-picking zones, so that the order-picking persons 32 can work undisturbed.

In FIG. 1 the flow rack channels 50 are exemplarily arranged beneath the order-container conveyor 36, and preferably end (above) in an ergonomical grabbing height closely in the vicinity of the buffer locations 42 so that the order-picking person 32 can take A-articles in an ergonomical favourable manner and deliver the same to the order containers 44 waiting at the buffer locations 42. The delivery preferably happens by means of a light guidance (pick-by-light) wherein display devices are utilized as will be explained in more detail below with reference to FIGS. 2 and 3.

Alternatively, the flow rack channels 50 can also be led beneath the conveyors 36, 38. In this case, the conveyors 36, 38 can be arranged at the same height. Then, a height difference does not need to be overcome.

Figure 2:
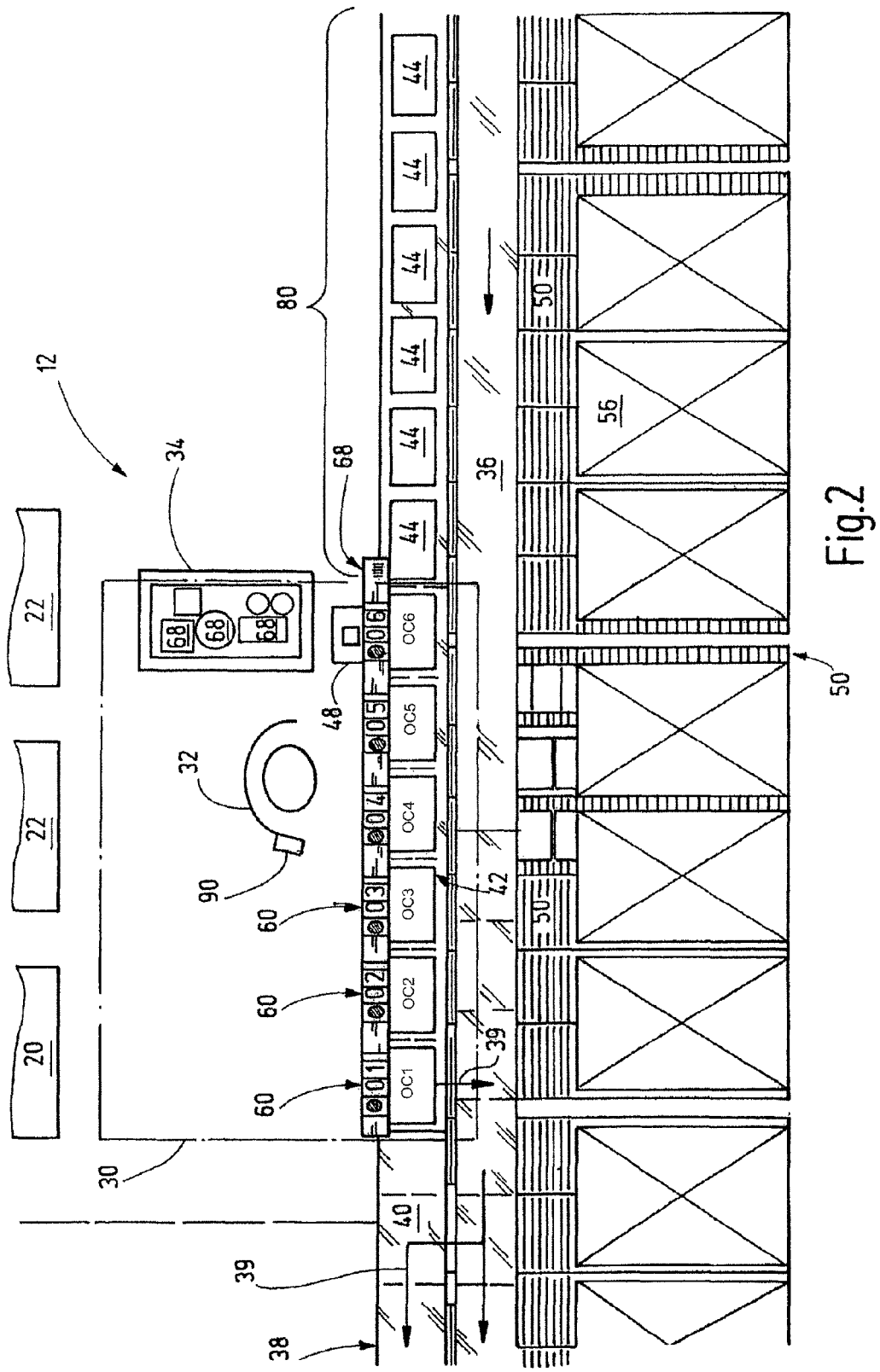
FIG. 2 shows an isolated top view of the order-picking zone of FIG. 1 at the right-hand side.

With reference to FIG. 2 the order-picking station 30, which is depicted in FIG. 1 in the outermost right hand order-picking zone comprising the warehouse area 12, is shown in an enlarged illustration.

The order-picking station 30 of FIG. 2 comprises six buffer locations 42. One order container 44 is provided at each one of the buffer locations 42, the order containers 44 being designated by OC1, . . . , OC6 within the order-picking station 30. The buffer locations 42 form an order-container buffer dedicated to the six order containers OC1-OC6. At one side of the buffer facing the order-picking person 32, a display device 60 is provided for each one of the buffer locations 42 as will be explained in more detail with reference to FIG. 3.

Figure 3:
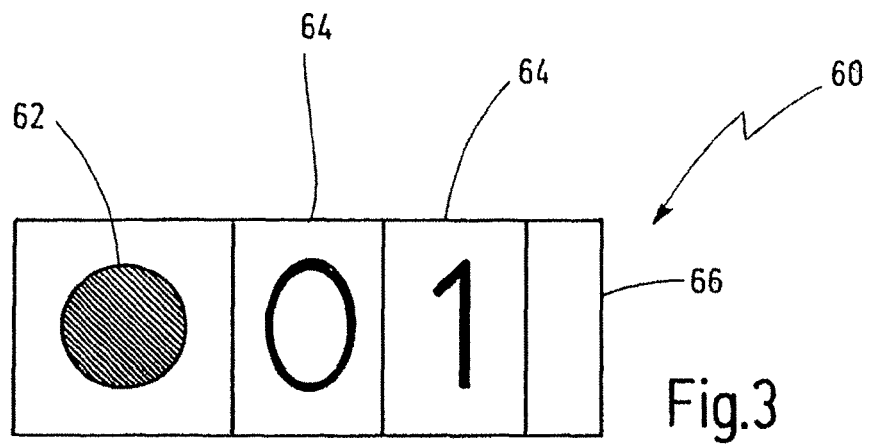
FIG. 3 shows an isolated view of a display device of a buffer location of FIG. 2.

In FIG. 3 one of the display devices 60 of FIG. 2 is shown in detail. In this case, the display device 60 comprises, for example, one lamp 62 which can be turned on and off. Further, the display device 60 comprises, for example, two digital displays 64, allowing indicating to the order-picking person 32 a number of articles which is to be delivered to the assigned order containers 44. For example, the lamp 62 and the digital displays 64 are integrated in a housing 66. The display device 60 communicates with a superordinated controlling device 58, which is indicated in FIG. 1 by means of a cloud. An information exchange with the controlling device 58, which can be implemented in terms of a computer, either happens via lines or wireless.

Returning to FIG. 2 the bar code scanner 48 for reading article identifications of the articles which are required during the distribution of articles retrieved to the order containers OC1-OC6 is additionally provided in the area of the order-picking station 30.

At the entrance of the other conveyor 38 in the order-picking station 30 one container scanner 48 is exemplarily provided in FIG. 3 which reads the container identifications and transmits the same to the controlling device 58 for the purpose for assigning the display devices 60 of the buffer locations 42 to incoming order containers 44. Further, an order-picking station identification such as a bar code can be provided in this area so that the order-picking person 32 can log-in at the controlling device 58.

FIG. 2 also shows a waiting group 80 of order containers 44 replacing the order containers OC1-OC6 as soon as they are picked completely and have left the order-picking station 30 via a discharging device 39.

Even further, a collecting trolley 34 including collected (i.e. retrieved) articles 68 is shown in FIG. 2. The order-picking person 32 has assigned one collecting order which is transmitted to a reading and displaying device 90 which can be carried permanently by the order-picking person 32, in order to allow putting the articles 68 into the collecting trolley 34. Alternatively, the reading and displaying device 90 could also be mounted to the collecting device 33.

Figure 4:
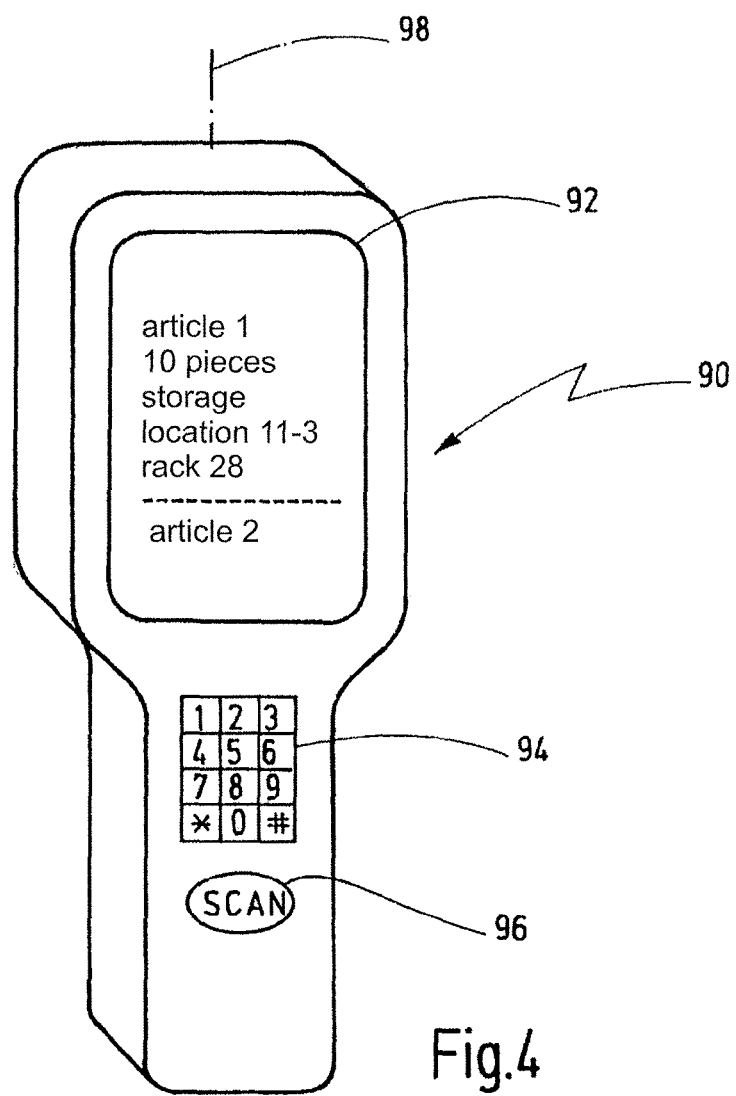
FIG. 4 shows a hand-held terminal.

The reading and displaying device 90 is exemplarily shown in FIG. 4 in terms of a so-called "hand-held terminal". The hand-held terminal of FIG. 4 comprises a display 92, an input field 94, an optional scan button 96 as well as a scanner for emitting scanning rays 98. The collecting order is displayed on the display 92, allowing the order-picking person 32 walking along a picking route 35 (cf. FIG. 1) through his warehouse area 12, 14 or 16 assigned to him, in order to retrieve the articles 68 from the rack blocks 18.

The collecting order is generated dependent on the picking orders being assigned to the group 80 of order containers OC1-OC6 which are standing on the buffer locations 42 in the order-picking station 30. The controlling device 58 generates the collecting order preferably in a route-optimized manner, i.e. the route 35 through the corresponding warehouse area 12-16 is chosen such that the route is as short as possible. The collecting order is generated based on the picking orders being assigned to the order containers 44 of the group 80 of order containers. The assigned picking orders are analized in order to extract a respective article-type specific sum of articles which are required according to the picking orders and which are present (i.e. stored) in the corresponding warehouse area(s). The collecting order lists the different places to go to (provision locations) within the rack area 12-14 for signalling to the order-picking person 32 how many articles are to be picked from a specific provision location in the racks. A provision location is to be understood hereinafter as a storage location where articles, preferably of one type only, of a specific type are stored. The group 80 of order containers preferably only contains order containers 44 (i.e. picking orders) which can be processed at the order-picking station 30 in terms of articles stored in the warehouse area assigned to this order-picking station 30. Of course, partial picking orders can be generated covering only such types of articles which are stored in the corresponding warehouse areas.

As soon as the order-picking person 32 has finished one collecting order, i.e. the articles have been collected as well as distributed to the order containers, the identification of the order-picking station is read, thereby signalling to the controlling device 58 that the order-picking person is ready to receive a new collecting order. The next group of order containers preferably is already ready, and is subsequently fed to the order-picking station 30. The associated collecting order has already been calculated by the controlling device 58 in advance, and is then transmitted to the reading and displaying device 90 of the order-picking person 32. The order-picking person 32 again collects all of the articles 68 stored and required by means of the collecting device 33 and returns to the order-picking station 30, after having collected all of the articles 68, for distributing the retrieved articles 68 from the collecting device 33 to the order containers OC1-OC6 waiting at the buffer locations 42.

For this purpose, the retrieved articles 68 are read by means of the article-reading device 46. The controlling device 58 subsequently activates the display devices 60, for example, by turning on the lamps 62. Each of the order containers OC1-OC6, which requires this specific type of article just read (and identified), is then lit up by means of the lamp 62. Optionally, a respective quantity of articles 68 which needs to be delivered to the order containers OC1-OC6, can also be displayed by means of the digital displays 64.

Alternatively, each of the articles 68 of the collecting order can be read and distributed individually. In this case, the display of the number of the articles 68, which are to be delivered to the order containers OC1-OC6, is superfluous.

If two or more order-picking persons 32 work in parallel within the area of one order-picking station 30, the lamps 62 can be divided, for example, by different colors so that the controlling device 58 is allowed to individually display for each of the order-picking person 32 which of the order containers OC1-OC6 is to be filled with a type of article which has just been read and identified.

In another alternative a plurality of order-picking persons 32 can work sequentially at the order-picking station 30. While a first order-picking person 32 distributes articles 68 to the order containers OC1-OC6 during the second stage, another order-picking person 32 can process his collecting order, i.e. walk along the picking route 35 through the warehouse for collecting the articles 68 in accordance with the first stage.

Figure 8:
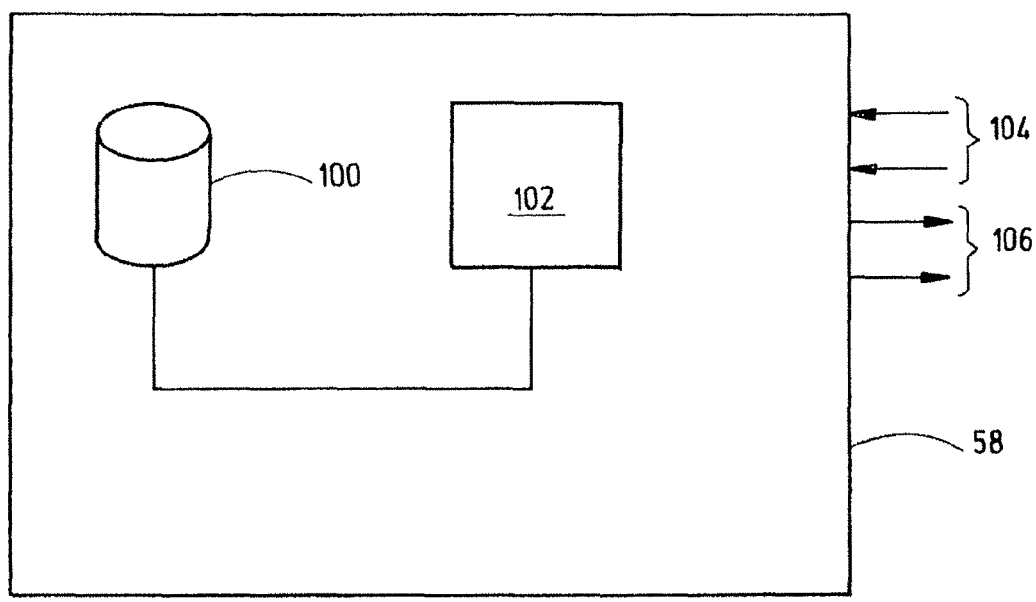
FIG. 8 shows a block diagram of a controlling device as used with the present invention.

In order to generate a collecting order, the controlling device 58 is provided with a database 100 in which the provision locations, the order-picking zones or the warehouse areas 12-14, the corresponding types of articles, the number of articles, etc. are stored (cf. FIG. 8). The controlling device 58 is provided with a device 102 for generating collecting orders. The controlling device 58 receives via inputs 104 thereof information on, for example, the order containers 44 which are transported by means of the order-container conveyor 36 through the storage and order-picking system 10. Each of the order containers 44 has assigned a picking order. The controlling device 58 can decide dependent on whether or not (at least) one article 68 of the picking order is present in the warehouse area 16-18 if the corresponding order container 44 is discharged towards the order-picking station 30 associated to this warehouse area 12-16. In this manner it is possible to assemble a group 80 of order containers 44. As soon as the group 80 of order containers 44 is assembled, it is also determined which of the picking orders belongs to the group 80. Then, the collecting order is generated from these picking orders by means of the device 102, wherein route optimizations can be taken into account. The controlling device 58 can forward the corresponding information to the actuators and display devices of the system 10 via outputs 106 of the controlling device 58, two of which, similar to the inputs 104, are shown exemplarily in FIG. 8. The controlling device 58 can be computer.

Figure 5:
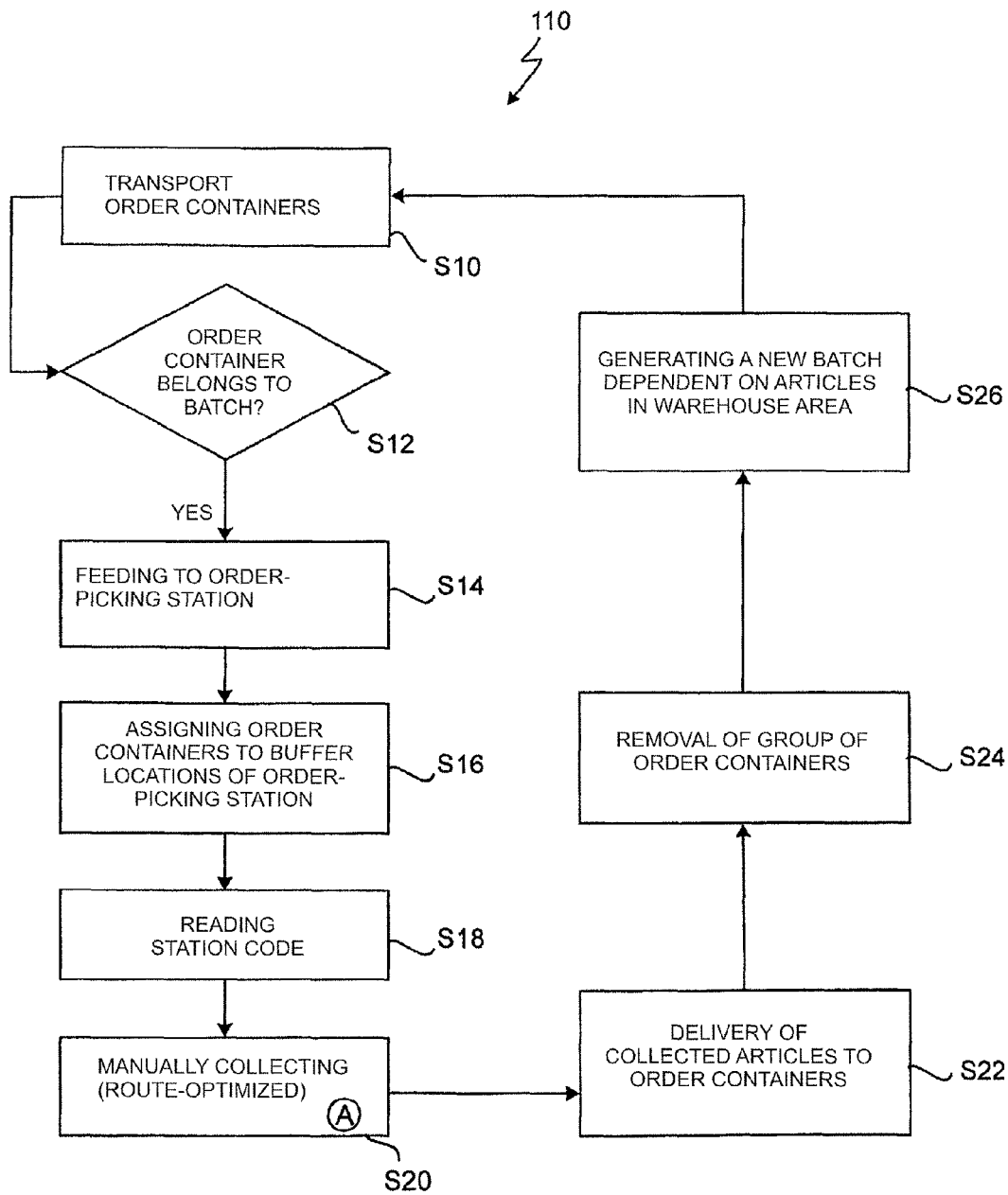
FIG. 5 shows a flow chart of a method of the present invention.

This is also reflected in the method 110 of the present invention in FIG. 5 which shows a schematized flow chart of the method 110.

In step S10 the order containers 44 are transported within the system 10. The controlling device 58 forms groups 80 of order containers 44 and examines in a step S10 at each entrance of an order-picking zone, whether an order container 44, which has just passed, belongs to the group 80, wherein an order container 44 is to be discharged from the order-container conveyor 36 to the conveyor 38 towards the associated order-picking station 30. If the order container 44 does not belong to the group 80, the order container may pass without being discharged. However, if the order container belongs to the group 80, then the order container is fed into the order-picking station 30 in step S14. In step S16 each of the order containers 44 is assigned to one buffer location 42 within the order-picking station 30. Optionally, a container identification can be determined once again during the step S16 at the entrance of the order-picking station 30, thereby allowing performance of a secure assignment of the buffer locations 42 to the order containers 44.

Optionally, in a step S18 the order-picking person 32 can read an identification of the order-picking station 30 by means of his reading and displaying device 90 for signalling to the controlling device 58 that the order-picking person is ready for processing a collecting order (first order-picking stage). In step S20 the collecting order is then manually processed, while the order-picking person 32 walks along the route-optimized route 35 through the corresponding warehouse area 12-16 and retrieves the articles 68 predetermined by the collecting order from the corresponding provision locations in the rack blocks 18. The step S20 will be explained in more detail with reference to FIG. 6.

In step S22 the order-picking person 32 delivers the collected articles 68 to the order containers OC1-OC6 provided at the buffer locations 42. As soon as all of the order containers OC1-OC6 of the group 80 are filled at the order-picking station 30 with the corresponding articles 68, the order containers OC1-OC6 are removed by feeding the same to the order-container conveyor 36 (cf. step S24) from the other conveyor 38.

In step S26 a new batch for this order-picking station 30 is generated dependent on the articles 68 which are stored in the warehouse area 12, 14 or 16 being assigned to the order-picking station 30, after the preceeding collecting order is processed, and the process starts from the beginning.

Figures 6, 7:
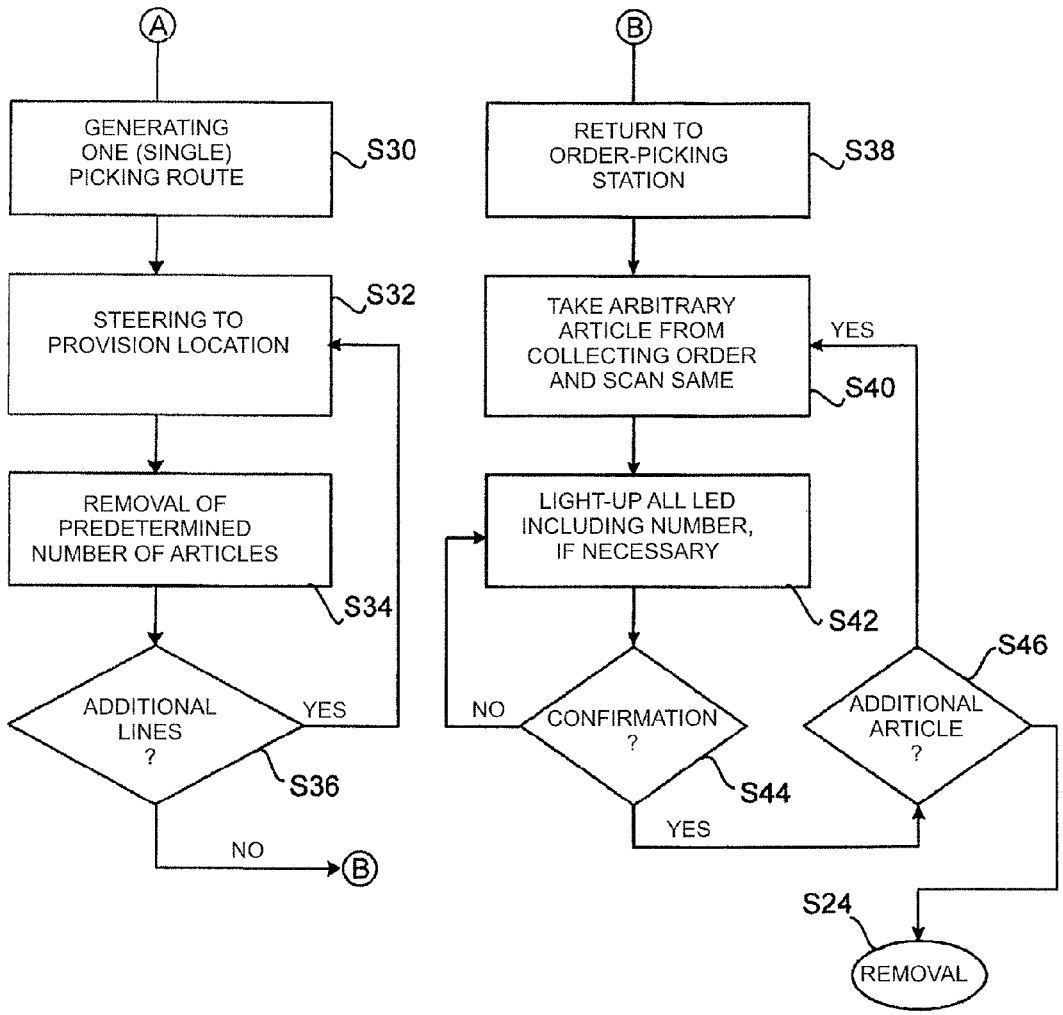
FIG. 6 shows detailed steps of a partial step of FIG. 5.
FIG. 7 shows additional detailed steps of a partial step of FIG. 5.

With reference to FIG. 6 step S20 of FIG. 5 is explained in more detail.

In step S30 one single picking route 35 is generated if no bulky articles 68 are included in the picking order. The step S30 can temporarily take place before the order containers 44 are fed to the order-picking station 30 (cf. step S14 of FIG. 5), namely as soon as the controlling device 58 generates a group 80 of order containers 44 for one of the specific warehouse areas 12-14 dependent on the articles 68 being contained in the corresponding picking orders.

In step S32 the order-picking person 32 moves to the provision locations in accordance with the collecting order and removes in step S34 a number of articles 68, which is predetermined by the collecting order, from the provision locations. Then, the order-picking person 32 checks in step S36 whether additional order lines are to be processed. If additional order lines of the collecting order are to be processed, the order-picking person returns to the step S32. If no other order lines are to be processed, the order-picking person returns to the order-picking station 30 as will be explained in more detail with reference to FIG. 7.

With reference to FIG. 7 the order-picking person 32 returns to the order-picking station 30 in step S38. Subsequently, the order-picking person 32 removes an arbitrary article 68 from the collecting device 33 which he has carried all the time during his route through the warehouse area 12-16. Then, in step S40 the removed article 68 is detected, e.g. as scanned, and identified by the controlling device 58. Then, in step S42 the controlling device 58 outputs corresponding signals to the display device 60 which are assigned to such order containers OC1-OC6 which currently require the identified type of article. If necessary, at the same time the number of the articles 68 of the identified type of article is displayed. In step S44 it is inquired whether the delivery of the collected articles 68 to the order containers OC1-OC6 has already been confirmed. If no confirmation is present, then the LEDs of the display devices 60 are still lit up. A confirmation can happen, for example, in that the order-picking person 32 reads the next type of article, or light grids are provided above the openings of the order containers OC1-OC6 which can detect the insertion of the articles 68 into the order containers OC1-OC6. Ideally, it can also be counted in this manner how many of the articles 68 have been inserted into the corresponding order containers OC1-OC6. The provision of light grids represents an additional safety measure which additionally decreases the number of order-picking errors.

If a confirmation is present, it is inquired in step S46 whether additional collected articles 68 need to be distributed to the waiting order containers OC1-OC6. If additional articles 68 are distributed, one returns to the step S40. If no additional articles 68 are distributed, one proceeds to the step S24 of FIG. 5 so that the completely picked order containers OC1-OC6 are removed from the order-picking station 30 for generating space for the next group 80 of order containers 44.

In an alternative to the above-mentioned "hand-held terminals" other reading and displaying devices can be used as well. For example, a ring scanner having a connected display is mentioned. This scanner is worn similar like a ring on one of the order-picking person's fingers and is connected to the controlling device 58, for example, via radio for transferring, for example, the identification of the order-picking station, container identification, article identification, provision location identification and similar to the controlling device 58. The controlling device 58 in turn transmits data being relevant to the order-picking process to the order-picking person 32 who is shown this data via the display. Such a display, for example, can be strapped on the order-picking person's forearm. Via the display the order-picking person 32 is shown, for example, also his collecting order. If necessary, the order-picking person 32 can also be signalled the order container OC1-OC6, which is to be filled in the second order-picking stage, if the display devices 60 failed, for example, due to a defect.

The article-reading device 46 can be integrated, for example, into the collecting trolley 34. The article-reading device 46 can be arranged stationary at an arbitrary location in the vicinity of the buffer locations 42, which, however, can extend the routes which are to be covered by the order-picking person 32.

Therefore, what we claim is:

1. A method for operating in a two stage batch mode a storage and order-picking system including at least one warehouse area and one order-picking station assigned to the at least one warehouse area, the at least one warehouse area comprising a plurality of provision locations where respectively articles of one type of article only is stored, the order-picking station including a plurality of buffer locations, wherein each of the buffer locations respectively comprises a display device, wherein stored articles are manually removed and delivered by an order-picking person who is equipped with a collecting device for buffering removed articles; the method comprising:

detecting a plurality of picking orders, wherein each of the picking orders comprises a plurality of ordered articles which differ in type of article and quantity ordered, and is assigned to at least one of the order containers;

analyzing the detected picking orders in order to determine a group of order containers, the assigned picking orders of which do all require articles stored in the at least one warehouse area;

determining the group of order containers;

moving the determined group of order containers to the order-picking station, wherein each of the order containers of the determined group of order containers is buffered at one of the buffer locations;

determining a collecting order based on the picking orders assigned to the order containers of the group of order containers;

using a computer to determine a route-optimized manner that optimizes movements for an order-picking person;

retrieving to-be-picked articles from the at least one the warehouse area in accordance with the collecting order, wherein the step of retrieving comprises:

directing the order-picking person to move in the route-optimized manner through the at least one warehouse area, to manually-remove articles in accordance with the collecting order and to deliver the same unsorted to a collecting device, which is carried by the order-picking person for buffering the removed articles;

and directing the retrieved articles to be manually distributed to the group of order containers provided at the buffer locations, wherein at least one article of each type of article retrieved is scanned and identified before the order-picking person gets signalled by one of the display devices to which of the associated order containers a respective quantity of articles of the scanned and identified type of article is to be transferred from the collecting device.

2. The method of claim 1, wherein each of the retrieved articles of the collecting orders is scanned and identified before the step of distributing the same, wherein the order-picking person scans each of the retrieved articles individually at the order-picking station, wherein the display devices of the buffer locations only need to indicate to which of the buffered order containers the identified article is to be transferred to.

3. The method of claim 1, wherein each of the at least one warehouse areas is simultaneously served by more than one order-picking person, wherein each of the order-picking persons gets assigned an individual display signal for identifying the order containers buffered at the order-picking station by means of the respective display device.

4. The method of claim 1, wherein the order-picking person gets the provision locations signalled before removal by means of a reading and displaying device.

5. The method of claim 1, wherein the step of determining the group of picking orders is started by scanning an identification of the order-picking station.

6. The method of claim 1, wherein a partial-picking order relating to a bulky article is processed in terms of an individual picking order separately from the collecting order including a remainer of an initial picking order, which only comprises articles being handable normally.

7. The method of claim 1, wherein each of the order containers has an individuel container identification which is scanned for each of the order containers, the container identification being assigned to the buffer location where the respective order container is buffered at the order-picking station.

8. A storage and order-picking system for processing in parallel a group of picking orders in batch mode, the group of picking orders comprising a plurality of picking orders including a plurality of ordered articles which differ in a respective type of article and quantity, and being assigned to a group of order containers comprising a plurality of order containers, wherein the ordered articles are removed and delivered manually by at least one order-picking person, the system comprising:

at least one order-container conveyor configured to automatically transport order containers to specific destinations in the system;

an order-picking station, wherein the order-picking station comprises a plurality of buffer locations each being adapted for respectively receiving and buffering one of the order containers of the group of order containers, wherein each of the order containers of the group of order containers has assigned one of the picking orders of the group of picking orders;

at least one warehouse area which is assigned to the order-picking station and stores articles required for processing the group of picking orders in provision locations;

a collecting device moveable by the order-picking person through the at least one warehouse area during a collecting process for retrieving in a first processing stage, in accordance with a collecting order, all of the stored articles required for processing the group of picking orders from the at least warehouse area by removing the stored and required articles and buffering the same in the collecting device;

a reading and displaying device assigned to the order-picking person, which is configured to display to the order-picking person information on the articles to be retrieved based on the collecting order;

an article-reading device for scanning and identifying retrieved articles (68) with a respect to a type of article;

a plurality of display devices, wherein each of the buffer locations has assigned one of the display devices; and a controlling device which is adapted to:

assemble the group of order containers which is to be transported to the order-picking station dependent on the articles stored in the at least one warehouse area, and move the same to the order-picking station;

generate a route-optimized collecting order based on the articles required by the group of order containers;

display the route-optimized collecting order to the order-picking person;

operate the display devices of the buffer locations such that the order-picking person, after completing the retrieving process in accordance with the first processing stage, is signalled in a second processing stage, based on articles retrieved in the first processing stage and identified by means of the article-reading device, to which of the order containers provided at the buffer locations the identified article is to be distributed; and discharge the group of order container from the order-picking station, if all of the retrieved articles are distributed to the group of order containers.

9. The system of claim 8, wherein the at least one warehouse area is oppositely arranged relative to the order-picking station.

10. The system of claim 9, wherein at least one of B-articles and C-articles are stored in the at least one warehouse area.

11. The system of claim 8, wherein the at least one warehouse area further comprises flow rack channels disposed directly adjacent to the order-picking station, wherein the flow rack channels store A-articles.

12. The system of claim 8, wherein each of the buffer locations is implemented by a conveyor.

13. The system of claim 12, wherein each of the buffer locations is implemented by an accumulation conveyor segment.

14. The system of claim 12, wherein the conveyor is coupled to the order-container conveyor via feeding and discharging devices.

15. The system of claim 8, wherein the reading and displaying device is a hand-held terminal having an integrated scanner or finger scanner including a connected display unit, wherein the finger scanner is ring-liked shaped and wherein the display unit is mountable to a body of the order-picking person.

16. The system of claim 8, wherein display devices of the buffer locations respectively comprise at least one optical signal transmitter for signalling to the order-picking person at least one of the buffer locations and a quantity of to-be transferred articles which is different from 1.

17. The system of claim 8, wherein each of the provision locations is respectively provided with another displaying element, wherein the displaying element signals to the order-picking person at least one of the provision location and a quantity of articles to be removed.

18. The system of claim 8, wherein the article-reading device is a scanner which is mounted to one of the order-picking station and the collecting device.

19. A method for operating in a two-stage batch mode a storage and order-picking system including at least one warehouse area and one order-picking station assigned to the at least one warehouse area, the at least one warehouse area including a plurality of provision locations where articles of different types are stored, the order-picking station comprising a plurality of buffer locations comprising a plaurality of display devices, wherein stored articles are manually removed and delivered by an order-picking person; the method comprising the steps of:

detecting a plurality of picking orders, wherein each of the picking orders comprises a plurality of ordered articles which differ in type of article and quantity ordered, and is assigned to at least one of the order containers;

analyzing the detected picking orders in order to determine a group of order containers, the assigned picking orders of which do all require articles stored in the at least one warehouse area;

determining the group of order containers;

moving the determined group of order containers to the order-picking station, wherein each of the order containers of the determined group of order containers is buffered at one of the buffer locations;

using a computer to determine collecting order based on types of articles included in the picking orders assigned to the group of order containers;

retrieving stored articles from the at least one the warehouse area in accordance with the collecting order, wherein the step of retrieving comprises manually removing stored articles in accordance with the collecting order; and manually distributing the retrieved articles to the group of order containers provided at the buffer locations, wherein at least one article of each type of article retrieved is scanned and identified before the order-picking person gets signalled by one of the display devices to which of the order containers a resepective quantity of articles of the scanned and identified type of article is to be transferred.

\* \* \* \* \*